United States Patent
Humes

(10) Patent No.: US 6,628,933 B1
(45) Date of Patent: Sep. 30, 2003

(54) SYSTEM AND METHOD FOR PREVENTION OF EMERGENCY CALL DROPS IN A WIRELESS NETWORK

(75) Inventor: Michael E. Humes, Garland, TX (US)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/528,361

(22) Filed: Mar. 17, 2000

(51) Int. Cl.[7] .............................................. H04M 11/00
(52) U.S. Cl. ................. 455/404.1; 455/414.1; 455/453
(58) Field of Search .................. 455/404, 67.1, 455/422, 423, 434, 436, 439, 450, 512; 370/332

(56) References Cited

U.S. PATENT DOCUMENTS

| | | | |
|---|---|---|---|
| 5,475,870 A | * 12/1995 | Weaver et al. | 455/67.1 |
| 5,584,049 A | * 12/1996 | Weaver et al. | 455/67.1 |
| 6,173,168 B1 | * 1/2001 | Andersson | 455/404 |
| 6,192,232 B1 | * 2/2001 | Iseyama | 455/404 |
| 6,282,429 B1 | * 8/2001 | Baiyor et al. | 455/512 |
| 6,374,099 B1 | * 4/2002 | Bi et al. | 455/404 |

* cited by examiner

Primary Examiner—Dwayne Bost
Assistant Examiner—T. Richard Lei

(57) ABSTRACT

There is disclosed for use in a wireless network comprising a plurality of base transceiver substations capable of communicating with a plurality of mobile stations, an apparatus for preventing the dropping of an emergency call associated with a first one of the plurality mobile stations. The apparatus comprises a call drop controller for receiving from the wireless network a maintenance command directed to a first base transceiver substation handling the emergency call, determining whether the maintenance command may cause the first base transceiver substation to drop the emergency call and, in response to such a determination, preventing the maintenance command from being executed by the first base transceiver substation. The call drop controller also is capable of: 1) receiving a failure notification from a failed base transceiver substation, 2) determining whether the failed base transceiver substation is handling the emergency call and, 3) in response to such a determination, at least one of: a) increasing transmission power of at least one base transceiver substation proximate to the failed base transceiver substation; b) increasing a TDROP value of the failed base transceiver substation; and 3) decreasing a TADD value of at least one base transceiver substation proximate to the failed base transceiver substation.

20 Claims, 4 Drawing Sheets

SYSTEM AND METHOD FOR PREVENTION OF EMERGENCY CALL DROPS IN A WIRELESS NETWORK

TECHNICAL FIELD OF THE INVENTION

The present invention is directed, in general, to wireless networks and, more specifically, to a system for preventing 911 emergency calls from being dropped due to sector wilting in a base station.

BACKGROUND OF THE INVENTION

Wireless networks, and cellular telephone networks in particular, have become ubiquitous in society. Within the United States, cellular service is offered by cellular service providers, by the regional Bell companies, and by the national long distance operators. The enhanced competition has driven the price of cellular service down to the point where it is affordable to a large segment of the population.

One of the most important features of a wireless (or cellular) phone is its use in emergency situations. A wireless phone allows a subscriber to call for help nearly instantaneously from practically any location. Enhanced services in cellular phones may also allow a wireless network to remotely determine the location of a cellular telephone, thereby allowing police, firefighters and other emergency personnel to be sent to the location of the cellular phone.

However, certain maintenance procedures and emergency fault procedures may unintentionally cause an emergency call to be dropped as a result of "wilting" a sector or even an entire base station. It is frequently necessary, for the purposes of routine maintenance and/or recovering from a critical fault, to reduce (i.e., to wilt) the power of one or more RF transmitters in a base station in a wireless network. The wilting may be done to a single sector in a multi-sector base station or it may be done to all sectors of the base station. Wilting a base station (or a sector) causes mobile stations that are in communication with the base station (or sector) to search for other base stations and eventually causes the mobile stations to be handed off to new base stations. If a new base station cannot be found in time, a call may be dropped due to the wilting. While this may be annoying for routine wireless telephone calls, dropping an emergency call may result in loss of life.

There is therefore a need in the art for improved wireless networks that are less susceptible to dropping emergency calls. In particular, there is a need for wireless networks that are less likely to drop emergency calls during routine maintenance or during critical failures in one or more sectors of a base station.

SUMMARY OF THE INVENTION

To address the above-discussed deficiencies of the prior art, it is a primary object of the present invention to provide, for use in a wireless network comprising a plurality of base transceiver substations capable of communicating with a plurality of mobile stations, an apparatus for preventing the dropping of an emergency call associated with a first one of the plurality mobile stations. According to an advantageous embodiment of the present invention, the apparatus comprises a call drop controller capable of 1) receiving from the wireless network a maintenance command directed to a first base transceiver substation handling the emergency call, 2) determining whether the maintenance command is capable of causing the first base transceiver substation to drop the emergency call and, 3) in response to a determination that the maintenance command may cause the first base transceiver substation to drop the emergency call, preventing the maintenance command from being executed by the first base transceiver substation.

According to one embodiment of the present invention, the call drop controller, in response to a determination that the maintenance command will not cause the first base transceiver substation to drop the emergency call, allows the maintenance command to be executed by the first base transceiver substation.

According to another embodiment of the present invention, the call drop controller is further capable of determining whether a second base transceiver substation proximate to the first base transceiver substation is handling a second emergency call, and, in response to a determination that the second base transceiver is handling the second emergency call, preventing the maintenance command from being executed.

According to still another embodiment of the present invention, the call drop controller, in response to a determination that the second base transceiver is not handling the second emergency call, allows the maintenance command to be executed by the first base transceiver substation.

It is also a primary object of the present invention to provide, for use in a wireless network comprising a plurality of base transceiver substations capable of communicating with a plurality of mobile stations, an apparatus for preventing the dropping of an emergency call associated with a first one of the plurality mobile stations, wherein the apparatus comprises a call drop controller capable of receiving from the wireless network a maintenance command directed to a first base station controller, determining whether the maintenance command is capable of causing a first base transceiver substation controlled by the first base station controller to drop the emergency call, and, in response to a determination that the maintenance command may cause the first base transceiver substation to drop the emergency call, preventing the maintenance command from being executed by the first base station controller.

According to a further embodiment of the present invention, the call drop controller, in response to a determination that the maintenance command will not cause the first base transceiver substation to drop the emergency call, allows the maintenance command to be executed by the first base station controller.

According to a still further embodiment of the present invention, the call drop controller is further capable of determining whether a second base transceiver substation proximate to the first base transceiver substation is handling a second emergency call, and, in response to a determination that the second base transceiver is handling the second emergency call, preventing the maintenance command from being executed by the first base station controller.

According to a yet further embodiment of the present invention, the call drop controller, in response to a determination that the second base transceiver is not handling the second emergency call, allows the maintenance command to be executed by the first base transceiver substation.

Another object of the present invention to provide an apparatus that prevents emergency calls from being dropped when a base station resource fails in the wireless network. Accordingly, in an advantageous embodiment of the present invention, there is provided, for use in a wireless network comprising a plurality of base transceiver substations capable of communicating with a plurality of mobile stations, an apparatus for preventing the dropping of an emergency call associated with a first one of the plurality mobile stations, wherein the apparatus comprises a call drop controller capable of: 1) receiving a failure notification from a failed base transceiver substation, 2) determining whether the failed base transceiver substation is handling the emergency call and, 3) in response to a determination that the failed base transceiver substation is handling the emergency call, at least one of: a) increasing transmission power of at least one base transceiver substation proximate to the failed base transceiver substation; b) increasing a TDROP value of the failed base transceiver substation; and 3) decreasing a TADD value of at least one base transceiver substation proximate to the failed base transceiver substation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith,"as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
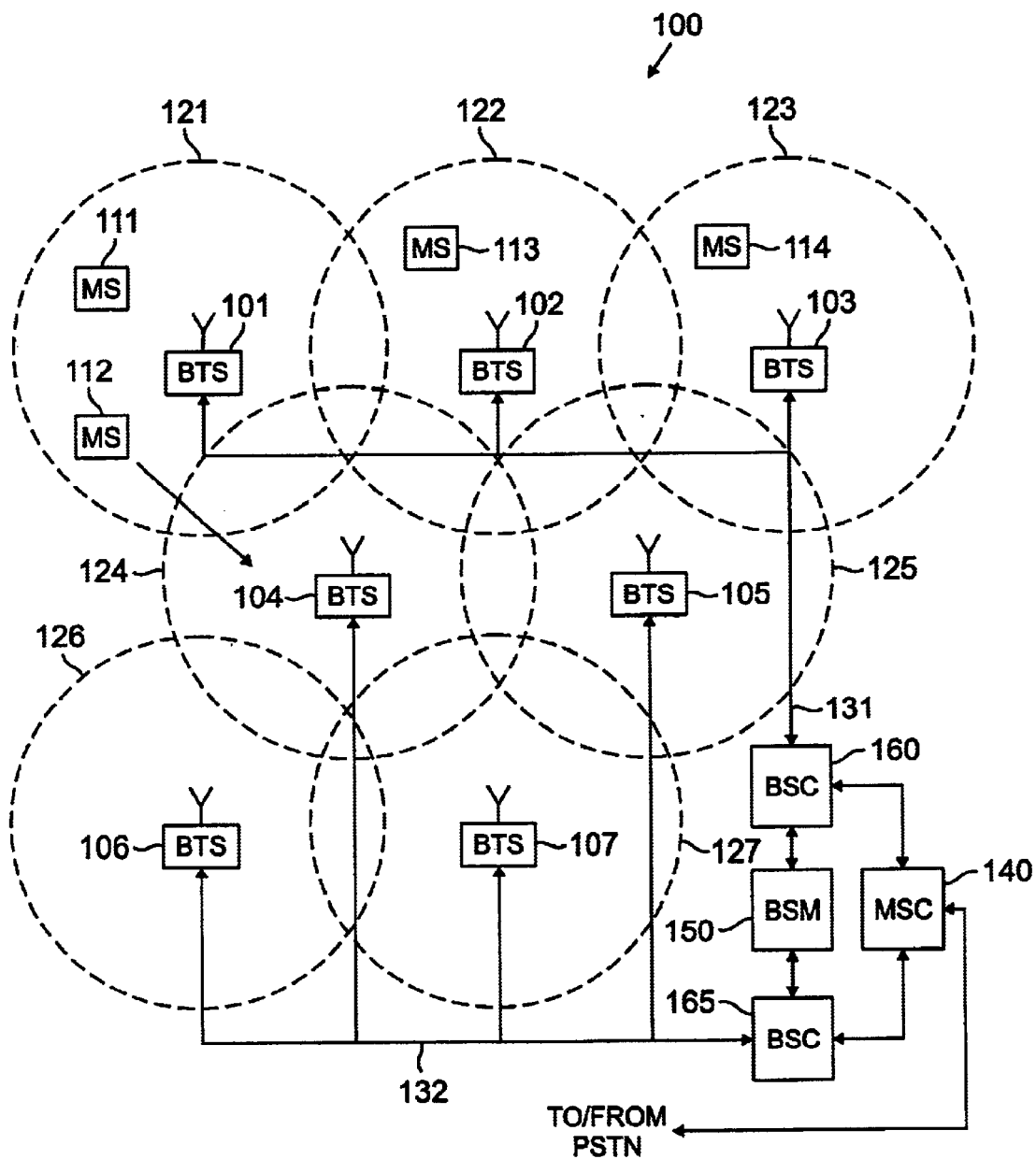
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–127, each containing one of the base transceiver substations (BTS), BTS 101, BTS 102, BTS 103, BTS 104, BTS 105, BTS 106, or BTS 107. Base transceiver substations 101–107 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of exemplary cell sites 121–127 in which base transceiver substations 101–107 are located. The cell sites are shown approximately circular for the purposes of illustration and explanation only. It should be clearly understood that the cell sites may have other irregular shapes, depending on the cell configuration selected and natural and man-made obstructions.

In a typical wireless network, a base transceiver subsystem is at the center of each cell site. Frequently, multiple base transceiver subsystems may be connected to a single base station controller (BSC) and multiple base station controllers may be connected to a single mobile switching center (MSC), such as MSC 140. Base station controllers, base transceiver subsystems, and mobile switching centers are well known to those skilled in the art. A base station controller is a device that manages wireless communications resources, including the base transceiver subsystem, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. A mobile switching center is a switching device that provides services and coordination between the subscribers in a wireless network and external networks, such as the public switched telephone network (PSTN) (not shown).

BTS 101, BTS 102 and BTS 103 transfer voice and data signals between each other and the public switched telephone network via communications line 131, base station controller 160, and mobile switching center 140. BTS 104, BTS 105, BTS 106, and BTS 107 transfer voice and data signals between each other and the public switched telephone network via communications line 132, base station controller 165, and mobile switching center 140. Communications lines 131 and 132 may be any suitable connection means, including a T1 line, a T3 line, a fiber optic link, a network backbone connection (such as an Internet protocol (IP) network), and the like. In some embodiments of the present invention, communications lines 131 and 132 may be several different data links, where each data link couples one of BTS 101, BTS 102, and BTS 103 to BSC 160 and one of BTS 104, BTS 105, BTS 106, and BTS 107 to BSC 165.

In the exemplary wireless network 100, MS 111 is located in cell site 121 and is in communication with BTS 101; MS 113 is located in cell site 122 and is in communication with BTS 102; and MS 114 is located in cell site 123 and is in communication with BTS 103. The MS 112 is also located in cell site 121, close to the edge of cell site 124. The direction arrow proximate MS 112 indicates the movement of MS 112 towards cell site 124. At some point, as MS 112 moves into cell site 124 and out of cell site 121, a "handoff" will occur.

As is well known, the "handoff" procedure transfers control of a call from a first cell to a second cell. For example, if MS 112 is in communication with BTS 101 and senses that the signal from BTS 101 is becoming unacceptably weak, MS 112 may then switch to a BTS that has a stronger signal, such as the signal transmitted by BTS 104. MS 112 and BTS 104 establish a new communication link and a signal is sent through BSC 165, MSC 140, and BSC 160 to BTS 101 and the public switched telephone network to transfer the on-going voice, data, or control signals through BTS 104. The call is thereby seamlessly transferred from BTS 101 to BTS 104. An "idle"handoff is a handoff between cells of a mobile device that is communicating in the control or paging channel, rather than transmitting voice and/or data signals in the regular traffic channels.

Wireless network 100 also comprises base station manager (BSM) 150, which is a central monitoring facility operated by the wireless service provider that operates wireless network 100. Maintenance personnel (sometimes referred to herein as "the craft") use BSM 150 to monitor the operation of the various base station controllers, base transceiver subsystems, and the mobile switching center that form wireless network 100. In addition to its monitoring capabilities, BSM 150 also may control the operations of each of the base station controllers, base transceiver subsystems, and the mobile switching center. This allows the maintenance personnel to reduce or to increase the transmitter power of the base station transmitters, to completely shut down base transceiver substations, to download new operating parameters or new software to base transceiver substations, among other things. Furthermore, BSM 150 may receive automatic failure notifications and status messages from one or more of the base station controllers, the base transceiver subsystems, and the mobile switching center.

Figure 2:
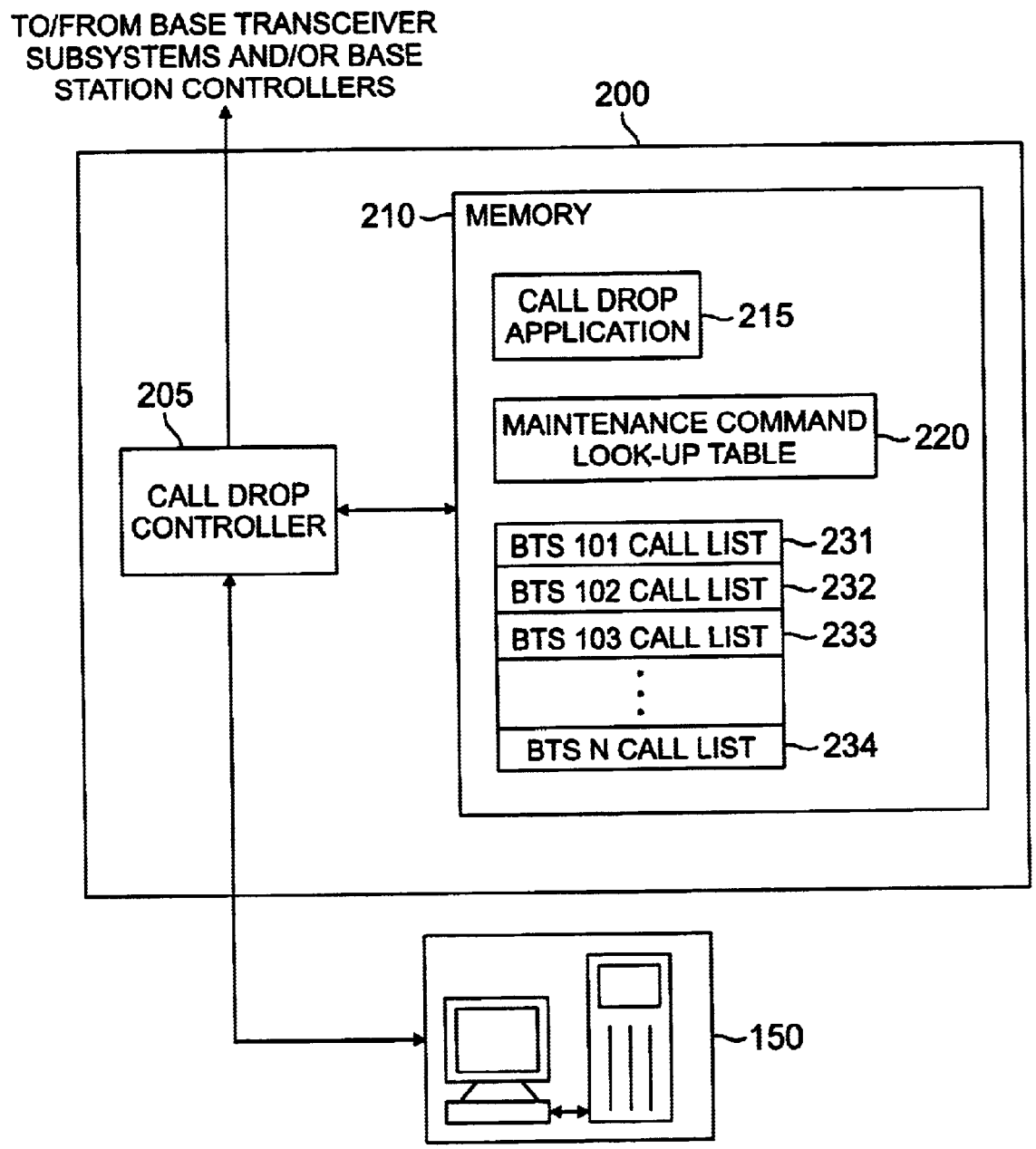
FIG. 2 illustrates an emergency call monitor system in the exemplary base station manager according to one embodiment of the present invention.

FIG. 2 illustrates emergency call monitor system 200, which is associated with, or located in, exemplary base station manager 150, according to one embodiment of the present invention. Emergency call monitor system 200 comprises call drop controller 205 and memory 210. Memory 210 comprises call drop application program 215, maintenance command look-up table (LUT) 220, and up to "N" call lists, one for each of the base transceiver subsystems in wireless network 100. The N call lists include exemplary call lists 231–234, which are labeled BTS 101 Call List, BTS 102 Call List, BTS 103 Call List, and BTS N Call List, respectively.

The term "controller" as used with respect to call drop controller 205 is broadly defined and may mean any device, system or part thereof that controls at least one operation. Those skilled in the art will recognize that such a device may be implemented in hardware, firmware, or software, or some combination of at least two of the same. Furthermore, the functionality associated with call drop controller 205 may be centralized or distributed, whether locally or remotely. Call drop controller 205 may comprise one or more data processors and associated input/output devices and memory that execute one or more application programs and an operating system program. In particular, call drop controller 205 may be a data processor that executes call drop application program 215.

According to the principles of the present invention, emergency call monitoring system 200 may be located in many different locations in wireless network 100, such as in BSC 160, BSC 165, MSC 140, or any one of BTS 101–107. Those skilled in the art will understand that the particular implementation of the present invention described hereafter in which emergency call monitor system 200 is associated with exemplary base station manager 150 is illustrative only.

Call drop application program 215 is a software program which directs the manner in which call drop controller 205 handles active 911 calls during times of scheduled or failure induced service restriction, such as for scheduled maintenance or in the event of a power amplifier failure, for example. Maintenance command look-up table (LUT) 220 stores various maintenance commands that may be received from maintenance personnel and which may affect communications with mobile stations. Maintenance command LUT 220 also store corrective actions which may be taken in the event that an emergency 911 call is in progress when the maintenance command is received. Each of exemplary call lists 231–234 stores a list of calls that are presently in progress for each network base transceiver substation, including information indicating whether or not a particular call is an emergency 911 call. The operation of emergency call monitor system 200 and its various components is described below in greater detail in connection with FIGS. 3 and 4.

Figure 3:
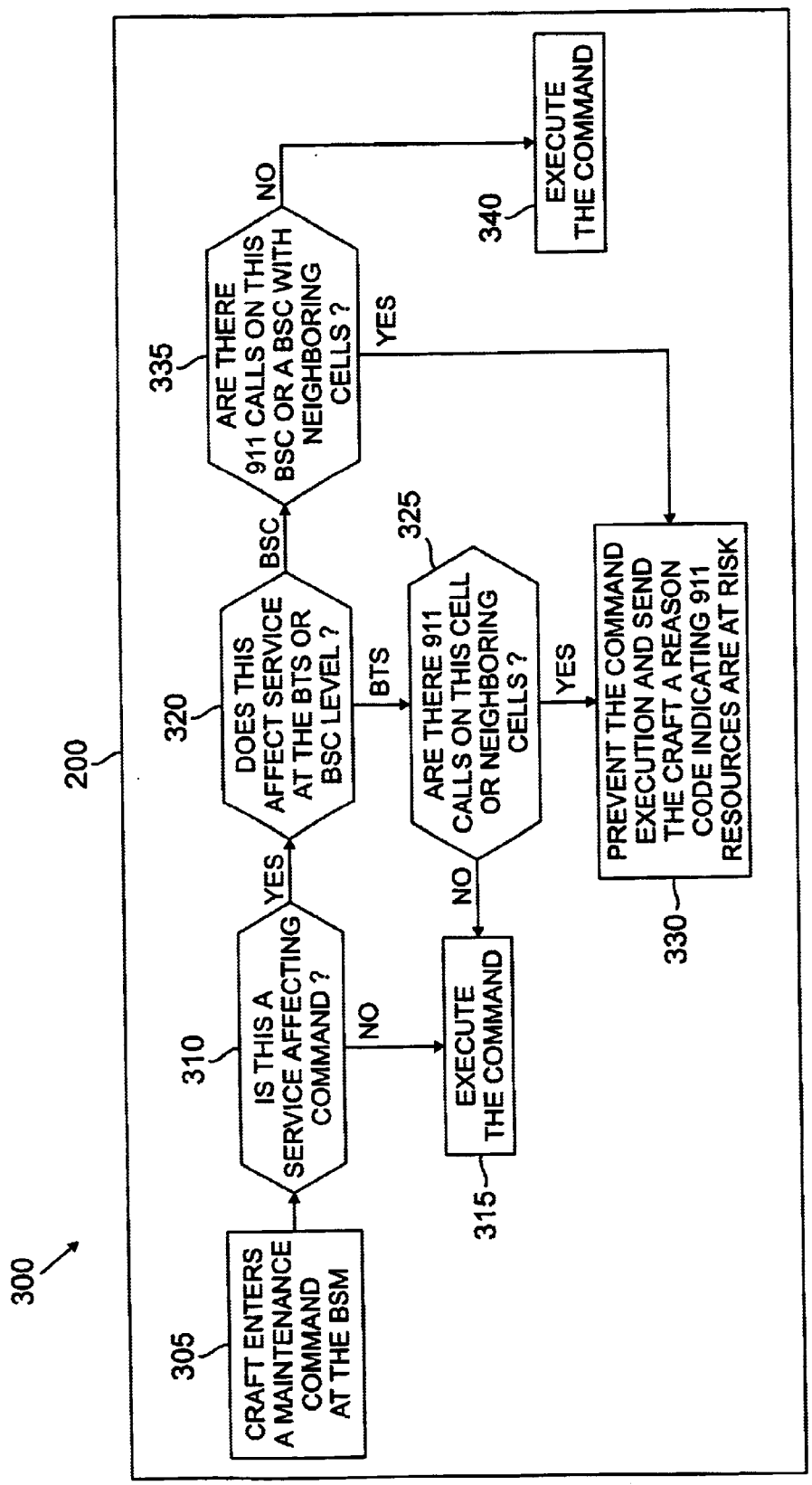
FIG. 3 is a flow chart illustrating the operation of an emergency call monitor system in response to actions taken by maintenance personnel according to one embodiment of the present invention.

FIG. 3 depicts flow chart 300, which illustrates the operation of an emergency call monitor system in response to actions taken by maintenance personnel according to one embodiment of the present invention. During routine maintenance, craft or maintenance personnel at base station manager (BSM) 150 may enter a maintenance command which is transferred to emergency call monitor system 200 (process step 305). Call drop controller 205, under the direction of call drop application program 215, examines maintenance command look up table (LUT) 220 to determine whether the entered maintenance command is a command which affects call service (process step 310). If data in LUT 220 indicates that the entered maintenance command is not a service affecting command, emergency call monitor system 200 forwards the command to the appropriate BTS and/or BSC (process step 315).

If the entered command does affect service, call drop controller 205 determines whether the command affects service at the base transceiver system (BTS) level or the base system controller (BSC) level (process step 320). If the entered command affects service at the BTS level, emergency call monitor system 200 examines call lists associated with the identified BTS for the presence of 911 calls on the cell site served by the BTS, as well as its neighboring cell sites. For example, if BTS 101 is the identified BTS, the service affected cell site is cell site 121, the neighboring cell sites are cell sites 122 and 124, and call lists 231, 232, and 234 are examined for the presence of 911 calls (process step 325). If no 911 calls are in progress, emergency call monitor system 200 forwards the command to the appropriate BTS and/or BSC (process step 315). If one or more 911 calls are in progress for the identified cell sites, emergency call monitor system 200 prevents the maintenance command from being forwarded to the appropriate BTS and/or BSC and sends a 911 resource risk notification to the maintenance personnel as an explanation for why the maintenance command was aborted (process step 330).

If the entered maintenance command is determined to affect service at the BSC level, emergency call monitor system 200 examines call lists associated with the affected BSC for the presence of 911 calls on cell sites served by the affected and by its neighboring cells. For example, if BSC 160 is the affected BSC, emergency call monitor system 200 checks call lists associated with BTS 101, BTS 102 and BTS 103, as well as the call lists for neighboring cell sites, such as BTS 104 and BTS 105, which are served by BSC 165 (process step 335). If no 911 calls are in progress, emergency call monitor system 200 forwards the command to the appropriate BTS and/or BSC (process step 340). If one or more 911 calls are in progress, emergency call monitor system 200 prevents the maintenance command from being forwarded to the appropriate BTS and/or BSC and sends a 911 resource risk notification to maintenance personnel as an explanation for why the maintenance command was aborted (process step 330).

Figure 4:
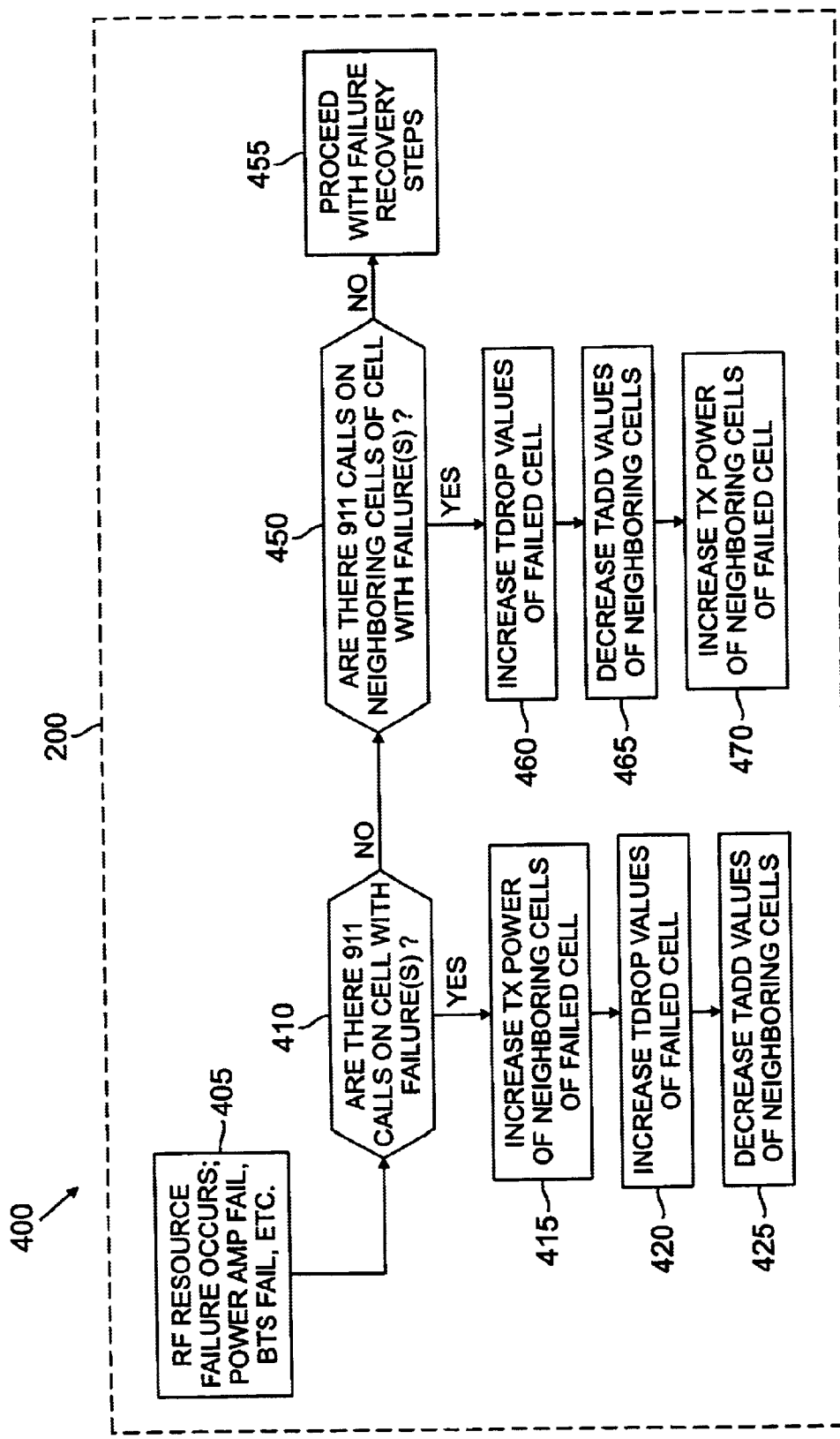
FIG. 4 is a flow chart illustrating the operation of an emergency call monitor system in response to automatic failure notifications generated by devices in the wireless network according to one embodiment of the present invention.

FIG. 4 depicts flow chart 400 which illustrates the operation of an emergency call monitor system in response to automatic failure notifications generated by devices in wireless network 100 according to one embodiment of the present invention. During normal operation, emergency call monitor system 200 may receive from a failing RF resource (for example BTS 101) a failure notification, such as a power amplifier failure notice, a base transceiver system failure notice, or the like (process step 405). Under the control of call drop application program 215, emergency call monitor system 200 determines if there are any 911 calls in progress in the cell associated with the failure, i.e. cell site 121 (process step 410).

If emergency call monitor system 200 determines that a 911 call is in BTS 101 Call List, emergency call monitor system 200 causes base transceiver substations (i.e., BTS 102 in cell site 122 and BTS 104 in cell site 124) adjacent to the failed BTS (i.e, BTS 101 in cell site 121) to increases transmit power levels. Increasing the power levels in adjacent cells increases the likelihood that the mobile station originating the 911 call (i.e., MS 112) will switch to an adjacent BTS with a stronger signal, such as BTS 104 (process step 415). Emergency call monitor system 200 also causes BTS 101 to increase its transmission threshold drop (TDROP) value, which is, in turn, transmitted to mobile stations in cell site 121. Increasing the TDROP value causes a mobile station, such as MS 112, to drop BTS 101 and move to another BTS sooner (process step 420). Emergency call monitor system 200 also causes neighboring base stations (i.e., BTS 102 and BTS 104) to decrease their transmission threshold addition (TADD) values. Decreasing TADDs for neighboring cells increases the likelihood that the mobile station with the 911 call, MS 112, will switch to a neighboring cell site, such as cell site 124 (process step 425). As it well known to those skilled in the art, TDROP and TADD are parameter used in code division multiple access (CDMA) wireless networks to set the boundaries (conditions) for performing a handoff.

If no 911 calls are indicated by BTS 101 call list 231, emergency call monitor system 200 examines BTS 102 Call List and BTS 104 Call List to determine if BTS 102 and BTS 104, which are adjacent to failed cell site 121, are processing 911 calls (process step 450). If emergency call monitor system 200 detects that no 911 calls are in progress in adjacent cell sites 122 and 124, emergency call monitor system allows the automated recovery procedures to proceed (process step 455).

If one or more 911 calls are found to be in progress in adjacent cells sites 122 or 124, emergency call monitor system 200 causes BSC 160 to increase the TDROP values of the failed BTS (i.e., BTS 101 in cell site 121) (process step 460) and to decrease the TADD values of BTS 102 and BTS 104 in neighboring cell sites 122 and 124 (process step 465). Increasing the TDROP value of BTS 121 and decreasing the TADD values of BTS 102 and BTS 104 makes it less likely that the mobile station(s) originating the 911 call(s) will attempt to handoff to BTS 101. Emergency call monitor system 200 also causes BTS 102 and BTS 104 to increase their transmit power. This further increases the likelihood that the 911 call will be maintained by adjacent cell sites 122 or 124 during the failure period (process step 470).

In another embodiment, emergency call monitor system 200 may delay selected fault recovery processes in order to maintain call service during periods of peak usage. For example, call drop application program 215, working in conjunction with LUT 220 and call lists 231–234, may be configured to detect the number of total calls which are in progress in one or more cell sites. Emergency call monitor system 200 may then warn the maintenance personnel when a large number of calls may be dropped if a specific maintenance command is activated for identified cell site(s). IN such an embodiment, maintenance personnel or the system administrator may determine the call traffic conditions under which maintenance action may be made.

In another embodiment of the present invention, emergency call monitor system 200 may enhance service for cell sites which have equipment failures during intervals of high traffic. In a further embodiment, emergency call monitor system 200 may allow maintenance personnel to override 911 or peak-traffic maintenance bypasses so that the maintenance process can proceed with alternative craft provided direction.

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base transceiver substations capable of communicating with a plurality of mobile stations, an apparatus for preventing the dropping of an emergency call associated with a first one of said plurality mobile stations, said apparatus comprising:

a call drop controller capable of receiving from said wireless network a maintenance command directed to a first base transceiver substation handling said emergency call, determining whether said maintenance command is capable of causing said first base transceiver substation to drop said emergency call, and, in response to a determination that said maintenance command may cause said first base transceiver substation to drop said emergency call, preventing said maintenance command from being executed by said first base transceiver substation.

2. The apparatus as set forth in claim 1 wherein said call drop controller, in response to a determination that said maintenance command will not cause said first base transceiver substation to drop said emergency call, allows said maintenance command to be executed by said first base transceiver substation.

3. The apparatus as set forth in claim 2 wherein said call drop controller is further capable of determining whether a second base transceiver substation proximate to said first base transceiver substation is handling a second emergency call, and, in response to a determination that said second base transceiver is handling said second emergency call, preventing said maintenance command from being executed.

4. The apparatus as set forth in claim 3 wherein said call drop controller, in response to a determination that said second base transceiver is not handling said second emergency call, allows said maintenance command to be executed by said first base transceiver substation.

5. For use in a wireless network comprising a plurality of base transceiver substations capable of communicating with a plurality of mobile stations, an apparatus for preventing the dropping of an emergency call associated with a first one of said plurality mobile stations, said apparatus comprising:
   a call drop controller capable of receiving from said wireless network a maintenance command directed to a first base station controller, determining whether said maintenance command is capable of causing a first base transceiver substation controlled by said first base station controller to drop said emergency call, and, in response to a determination that said maintenance command may cause said first base transceiver substation to drop said emergency call, preventing said maintenance command from being executed by said first base station controller.

6. The apparatus as set forth in claim 5 wherein said call drop controller, in response to a determination that said maintenance command will not cause said first base transceiver substation to drop said emergency call, allows said maintenance command to be executed by said first base station controller.

7. The apparatus as set forth in claim 6 wherein said call drop controller is further capable of determining whether a second base transceiver substation proximate to said first base transceiver substation is handling a second emergency call, and, in response to a determination that said second base transceiver is handling said second emergency call, preventing said maintenance command from being executed by said first base station controller.

8. The apparatus as set forth in claim 7 wherein said call drop controller, in response to a determination that said second base transceiver is not handling said second emergency call, allows said maintenance command to be executed by said first base transceiver substation.

9. For use in a wireless network comprising a plurality of base transceiver substations capable of communicating with a plurality of mobile stations, a method for preventing the dropping of an emergency call associated with a first one of the plurality mobile stations, the method comprising the steps of:
   receiving from the wireless network a maintenance command directed to a first base transceiver substation handling the emergency call;
   determining whether the maintenance command is capable of causing the first base transceiver substation to drop the emergency call; and
   in response to a determination that the maintenance command may cause the first base transceiver substation to drop the emergency call, preventing the maintenance command from being executed by the first base transceiver substation.

10. The method as set forth in claim 9 further comprising the step, in response to a determination that the maintenance command will not cause the first base transceiver substation to drop the emergency call, of allowing the maintenance command to be executed by the first base transceiver substation.

11. The method as set forth in claim 10 further comprising the steps of:
   determining whether a second base transceiver substation proximate to the first base transceiver substation is handling a second emergency call; and
   in response to a determination that the second base transceiver is handling the second emergency call, preventing the maintenance command from being executed.

12. The method as set forth in claim 11 further comprising the step, in response to a determination that the second base transceiver is not handling the second emergency call, of allowing the maintenance command to be executed by the first base transceiver substation.

13. For use in a wireless network comprising a plurality of base transceiver substations capable of communicating with a plurality of mobile stations, a method for preventing the dropping of an emergency call associated with a first one of the plurality mobile stations, the method comprising the steps of:
   receiving from the wireless network a maintenance command directed to a first base station controller;
   determining whether the maintenance command is capable of causing a first base transceiver substation controlled by the first base station controller to drop the emergency call; and
   in response to a determination that the maintenance command may cause the first base transceiver substation to drop the emergency call, preventing the maintenance command from being executed by the first base station controller.

14. The method as set forth in claim 13 further comprising the step, in response to a determination that the maintenance command will not cause the first base transceiver substation to drop the emergency call, of allowing the maintenance command to be executed by the first base station controller.

15. The method as set forth in claim 14 further comprising the steps of:
   determining whether a second base transceiver substation proximate to the first base transceiver substation is handling a second emergency call; and
   in response to a determination that the second base transceiver is handling the second emergency call, preventing the maintenance command from being executed by the first base station controller.

16. The method as set forth in claim 15 further comprising the step, in response to a determination that the second base transceiver is not handling the second emergency call, of allowing the maintenance command to be executed by the first base transceiver substation.

17. For use in a wireless network comprising a plurality of base transceiver substations capable of communicating with a plurality of mobile stations, an apparatus for preventing the dropping of an emergency call associated with a first one of said plurality mobile stations, said apparatus comprising:
   a call drop controller capable of receiving a failure notification from a failed base transceiver substation, determining whether said failed base transceiver substation is handling said emergency call and, in response to a determination that said failed base transceiver substation is handling said emergency call, at least one of:

increasing transmission power of at least one base transceiver substation proximate to said failed base transceiver substation;

increasing a TDROP value of said failed base transceiver substation; and decreasing a TADD value of at least one base transceiver substation proximate to said failed base transceiver substation.

18. For use in a wireless network comprising a plurality of base transceiver substations capable of communicating with a plurality of mobile stations, a method for preventing the dropping of an emergency call associated with a first one of the plurality mobile stations, the method comprising the steps of:

receiving a failure notification from a failed base transceiver substation;

determining whether the failed base transceiver substation is handling the emergency call; and in response to a determination that the failed base transceiver substation is handling the emergency call, at least one of:

increasing transmission power of at least one base transceiver substation proximate to the failed base transceiver substation;

increasing a TDROP value of the failed base transceiver substation; and decreasing a TADD value of at least one base transceiver substation proximate to the failed base transceiver substation.

19. For use in a wireless network comprising a plurality of base transceiver substations capable of communicating with a plurality of mobile stations, an apparatus for preventing the dropping of an emergency call associated with a first one of said plurality mobile stations, said apparatus comprising:

a call drop controller capable of receiving a failure notification from a failed base transceiver substation, determining whether a neighboring base transceiver substation proximate said failed base transceiver substation is handling said emergency call and, in response to a determination that said neighboring base transceiver substation is handling said emergency call, at least one of:

increasing a TDROP value of said failed base transceiver substation;

decreasing a TADD value of said neighboring base transceiver substation; and increasing transmission power of said neighboring base transceiver substation.

20. For use in a wireless network comprising a plurality of base transceiver substations capable of communicating with a plurality of mobile stations, a method for preventing the dropping of an emergency call associated with a first one of the plurality mobile stations, the method comprising the steps of:

receiving a failure notification from a failed base transceiver substation;

determining whether a neighboring base transceiver substation proximate the failed base transceiver substation is handling the emergency call; and in response to a determination that the neighboring base transceiver substation is handling the emergency call, at least one of:

increasing a TDROP value of the failed base transceiver substation;

decreasing a TADD value of the neighboring base transceiver substation; and increasing transmission power of the neighboring base transceiver substation.

* * * * *